United States Patent
Takahata et al.

(10) Patent No.: US 12,489,328 B2
(45) Date of Patent: Dec. 2, 2025

(54) ROTARY ELECTRIC MACHINE AND ELECTRIC DRIVE SYSTEM

(71) Applicant: Hitachi Astemo, Ltd., Hitachinaka (JP)

(72) Inventors: Ryouichi Takahata, Tokyo (JP); Masanori Sawahata, Tokyo (JP); Shinji Yamazaki, Hitachinaka (JP); Kenichi Nakayama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 167 days.

(21) Appl. No.: 18/558,086

(22) PCT Filed: Feb. 9, 2022

(86) PCT No.: PCT/JP2022/005144
§ 371 (c)(1),
(2) Date: Oct. 30, 2023

(87) PCT Pub. No.: WO2022/254801
PCT Pub. Date: Dec. 8, 2022

(65) Prior Publication Data
US 2024/0223035 A1    Jul. 4, 2024

(30) Foreign Application Priority Data
May 31, 2021  (JP) .................................. 2021-091040

(51) Int. Cl.
*H02K 3/12* (2006.01)
*H02K 3/14* (2006.01)
*H02K 3/50* (2006.01)

(52) U.S. Cl.
CPC ............... *H02K 3/12* (2013.01); *H02K 3/14* (2013.01); *H02K 3/50* (2013.01)

(58) Field of Classification Search
CPC ................................................ H02K 3/12–14
(Continued)

(56) References Cited

U.S. PATENT DOCUMENTS

| 2007/0200448 A1 | 8/2007 | Oowatari et al. |
| 2019/0109523 A1 | 4/2019 | Miyazaki et al. |

(Continued)

FOREIGN PATENT DOCUMENTS

| JP | 59-96842 A | 6/1984 |
| JP | 2007-228756 A | 9/2007 |

(Continued)

OTHER PUBLICATIONS

International Search Report (PCT/ISA/210) issued in PCT Application No. PCT/JP2022/005144 dated Apr. 5, 2022 with English translation (4 pages).
(Continued)

*Primary Examiner* — Oluseye Iwarere
*Assistant Examiner* — Minki Chang
(74) *Attorney, Agent, or Firm* — Crowell & Moring LLP (57) ABSTRACT

An object of the present invention is to provide a rotary electric machine capable of reducing a difference between a height of a first segment conductor and a height of a second segment conductor. A first segment conductor 121 having a first slot pitch and a second segment conductor 122 having a second slot pitch smaller than the first slot pitch are provided, the second segment conductor 122 includes a first leg portion 122A and a second leg portion 122B, the first leg portion 122A includes a slot insertion portion 122A0 and a first linear portion 122A2 connected to the slot insertion portion 122A0 and constituting a coil end portion, the second leg portion 122B includes a slot insertion portion 122B0 and a second linear portion 122B2 connected to the slot insertion portion 122B0 and constituting a coil end portion, and the second linear portion 122B2 is longer than the first linear portion 122A2.

8 Claims, 8 Drawing Sheets

(58) Field of Classification Search
USPC .................................................. 310/203–207
See application file for complete search history.

(56) References Cited

U.S. PATENT DOCUMENTS

2021/0344244 A1    11/2021  Koshiba et al.
2022/0200384 A1*  6/2022  Ahmed ................... H02K 3/12

FOREIGN PATENT DOCUMENTS

| JP | 2015-126630 A | 7/2015 |
| JP | 6423931 B1 | 11/2018 |
| JP | 2020-54052 A | 4/2020 |

OTHER PUBLICATIONS

Japanese-language Written Opinion (PCT/ISA/237) issued in PCT Application No. PCT/JP2022/005144 dated Apr. 5, 2022 with English translation (6 pages).

* cited by examiner

ROTARY ELECTRIC MACHINE AND ELECTRIC DRIVE SYSTEM

TECHNICAL FIELD

The present invention relates to a rotary electric machine and an electric drive system using the rotary electric machine.

BACKGROUND ART

As a background art of the present technical field, a rotary electric machine described in JP 2020-54052 A (PTL 1) is known. A stator of the rotary electric machine in PTL 1 includes a stator core and a coil wound around the stator core. The coil includes a basic coil segment having a pair of first leg portions and a first crossover portion disposed on a side of a first end face of the stator core, and a crossover coil segment having a pair of second leg portions and a second crossover portion disposed such that the first crossover portion is located between the second crossover portion and the first end face (see abstract). Further, PTL 1 describes a configuration where the basic coil segment includes a main coil segment and a sub coil segment, the main coil segment is inserted into two slots in which the pair of first leg portions are located at a distance of six pitches, and the sub coil segment is inserted into two slots in which the pair of first leg portions are located at a distance of five pitches (see paragraph 0023 and FIG. 4). In the stator of the rotary electric machine in PTL 1, a plurality of main coil segments and one sub coil segment are connected in series to constitute one coil constituent, and a plurality of (four) coil constituents is disposed in a radial direction of the stator core (see paragraph 0022 and FIG. 4).

CITATION LIST

Patent Literature

PTL 1: JP 2020-54052 A

SUMMARY OF INVENTION

Technical Problem

The main coil segments and the sub coil segment in PTL 1 are hereinafter referred to as segment conductors for description. If necessary, the main coil segments are called first segment conductors, and the sub coil segment is called a second segment conductor to be distinguished from each other.

In the case of manufacturing the first segment conductors and the second segment conductor having different slot pitches, it is not preferable that a bending angle between the first leg portion and an oblique side portion connecting the first leg portion and the second leg portion and a bending angle between the oblique side portion and the second leg portion are changed between the first segment conductors and the second segment conductor because the number of inspections associated with bending processing increases. In a case where the bending angle between the oblique side portion and the first leg portion and the bending angle between the oblique side portion and the second leg portion are not changed between the first segment conductors and the second segment conductor, the height of each first segment conductor and the height of the second segment conductor are different from each other. This causes a problem that a jig used in work of winding the coil around the stator core using each first segment conductor and the second segment conductor becomes complicated or the winding work becomes complicated, thus making an improvement in the bending accuracy of the segment conductors difficult.

An object of the present invention is to provide a rotary electric machine capable of reducing a difference between a height of a first segment conductor and a height of a second segment conductor.

Solution to Problem

In order to achieve the above object, a rotary electric machine of the present invention includes a stator including a stator core including a plurality of slots; and a coil wound around the stator core, the coil including a plurality of segment conductors each having slot insertion portions disposed respectively inside the plurality of slots and a first coil end portion protruding from one end surface in an axial direction with respect to the stator core, and a rotor disposed with a gap being spaced from the stator. The first coil end portion includes linear portions connected respectively to the slot insertion portions and oblique side portions having a chevron shape with center portions being apexes. The plurality of segment conductors includes a first segment conductor inserted into two of the plurality of slots arranged at a first slot pitch and a second segment conductor inserted into two of the plurality of slots arranged at a second slot pitch smaller than the first slot pitch. The second segment conductor has a second linear portion serving as the linear portion on one of the two slots and being longer than a first linear portion serving as the linear portion on the other one of the two slots. The center portion of the first segment conductor has a protruding height from the end surface of the stator core, the protruding height being substantially equal to a protruding height from the end surface of the stator core at the center portion of the second segment conductor.

Advantageous Effects of Invention

According to the present invention, it is possible to provide a rotary electric machine capable of reducing a difference between a height of a first segment conductor and a height of a second segment conductor.

Problems, configurations, and effects other than those described above will be clarified by the following description of embodiments.

DESCRIPTION OF EMBODIMENTS

Hereinafter, embodiments of the present invention will be described with reference to the drawings. The same reference numerals are given to the same configurations in the drawings to avoid duplication of description. Further, in a case where the same reference numerals are used but contents different from those in other drawings are included, the different portions will be described.

In the following description, a radial direction of a rotor 30 of a rotary electric machine 1 is indicated by r, a direction (axial direction) along a rotation shaft 32 of the rotor 30 is indicated by z, and a rotation direction of the rotor 30 is indicated by θ. Further, an axis line (central axis line) passing through the center of the rotation shaft 32 is indicated by Ax. That is, the axial direction coincides with the direction along the central axis line Ax of the rotation shaft 22. The rotation direction θ coincides with a circumferential direction around the central axis line Ax.

In the following description, an up-and-down direction, a vertical direction, and a horizontal direction may be designated to be described. These directions are directions set based on the respective drawings, and do not designate the up-and-down direction, the vertical direction, and the horizontal direction in the mounted state of the rotary electric machine 1. Note that a cross section of the rotary electric machine 1 cut in a direction vertical to the axial direction is referred to as a lateral cross section, and a cross section of the rotary electric machine 1 cut in the axial direction is referred to as a longitudinal cross section (r-z cross section).

First Embodiment

Figure 1:
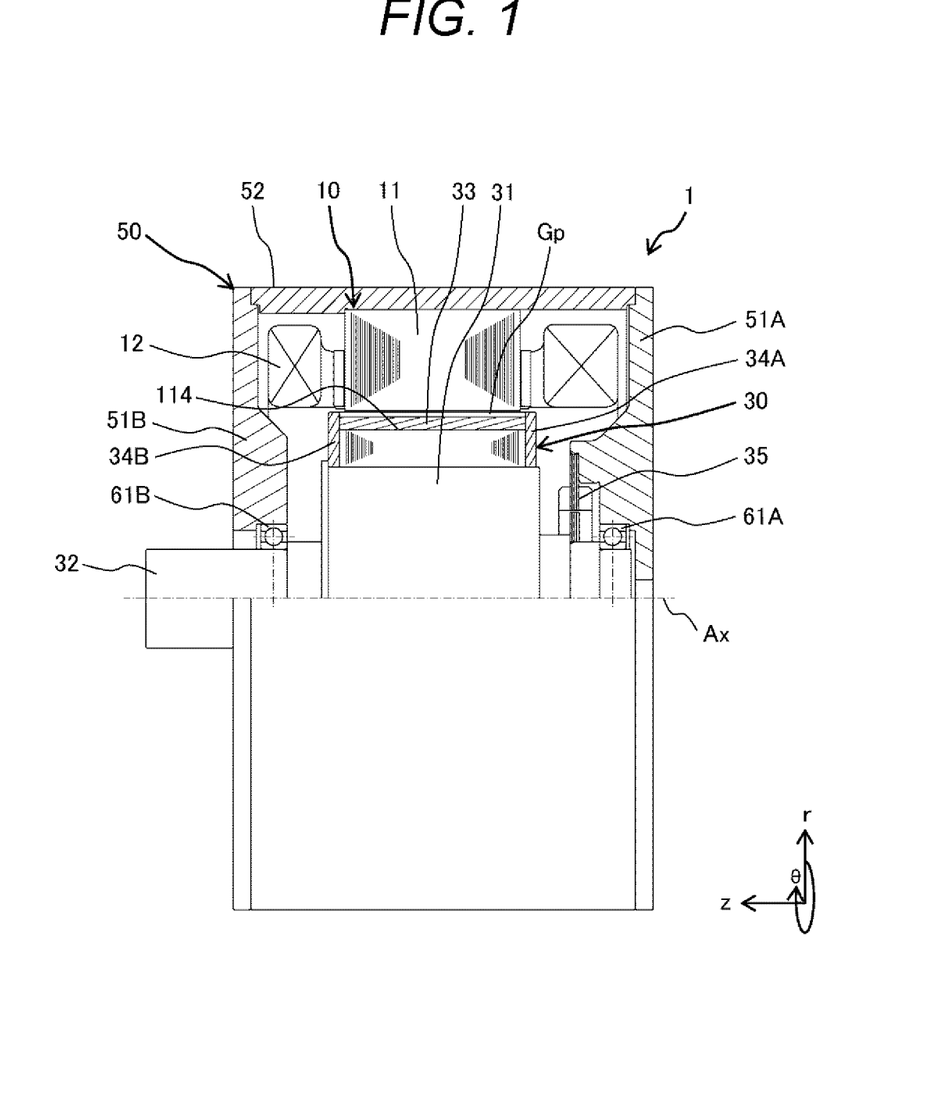
FIG. 1 is a cross-sectional view (longitudinal cross-sectional view) illustrating a cross section parallel to a center axis line Ax and including the central axis Ax of a rotary electric machine 1 of the present invention.
Figure 2:
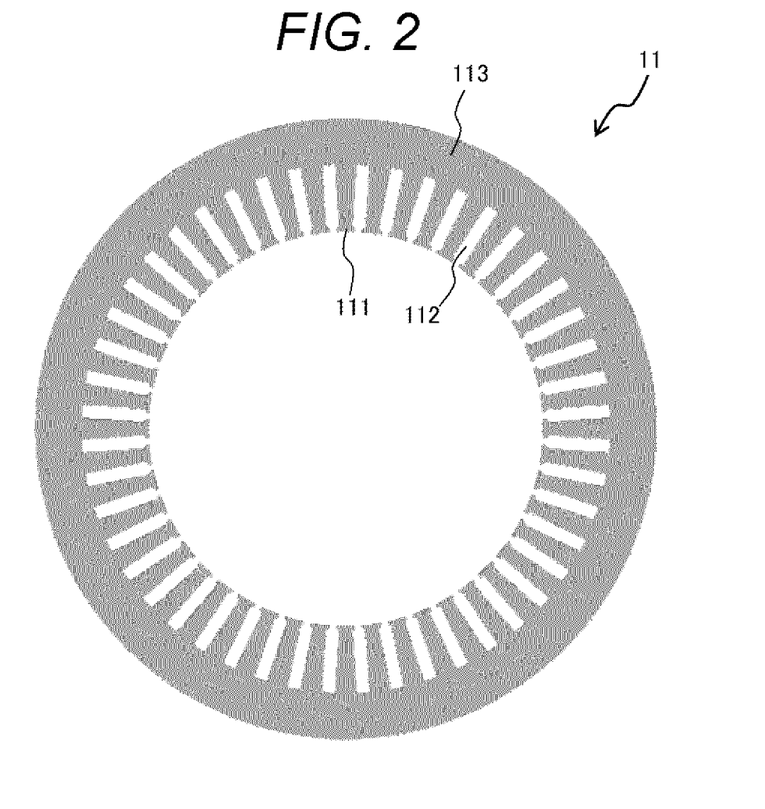
FIG. 2 is a diagram illustrating a stator core 11 constituting a stator 10 of the rotary electric machine 1 of the present invention, and is a plan view of the stator core 11 as viewed from an axial direction.
Figure 3:
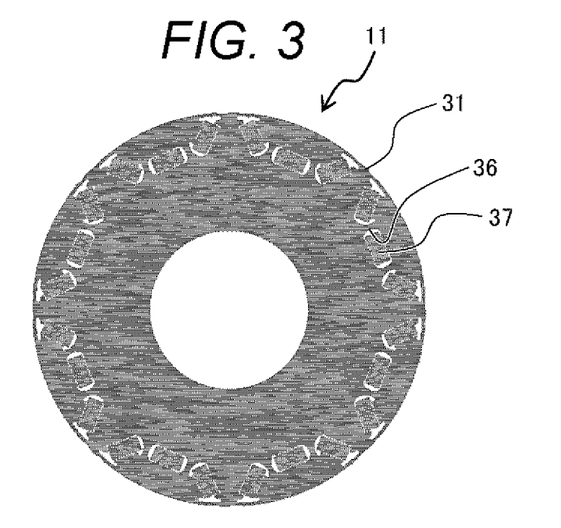
FIG. 3 is a diagram illustrating a rotor core 31 constituting a rotor 30 of the rotary electric machine 1 of the present invention, and is a plan view of the rotor core 31 as viewed from the axial direction.

The rotary electric machine 1 according to an embodiment of the present invention will be described with reference to FIGS. 1 to 3. FIG. 1 is a cross-sectional view (longitudinal cross-sectional view) parallel to the center axis line Ax and including the center axis line Ax of a rotary electric machine 1 of the present invention. FIG. 2 is a diagram illustrating a stator core 11 constituting a stator 10 of the rotary electric machine 1 of the present invention, and is a plan view of the stator core 11 as viewed from the axial direction. FIG. 3 is a diagram illustrating a rotor core 31 constituting a rotor 30 of the rotary electric machine 1 of the present invention, and is a plan view of the rotor core 31 as viewed from the axial direction. In FIG. 3, illustration of the rotation shaft 32 is omitted.

The rotary electric machine 1 of the present embodiment can be used, for example, as a traveling motor of an electric vehicle that travels using power of only the rotary electric machine or a hybrid electric vehicle that is driven by both an engine and the rotary electric machine.

As illustrated in FIG. 1, the rotary electric machine 1 includes the stator 10, the rotor 30, and a housing 50. The stator 10 is held inside the housing 50 and includes the stator core 11 and a stator winding (coil) 12.

The stator core 11 is a component of the stator 10, and is configured by laminating electromagnetic steel sheets (thin plates). As illustrated in FIG. 2, the stator core 11 includes an annular yoke 113, a plurality of teeth 111 protruding from the yoke 113 toward the rotor 30 in a comb shape, and a plurality of slots 112 each formed between the teeth 111. The slots 112 constitute a storage space for the coil 12. In the present embodiment, the stator core 11 having 48 slots is illustrated.

The coil 12 inserted into the slots 112 and wound around the stator core 11 includes three-phase U, V, and W windings.

As illustrated in FIG. 1, the rotor 30 is rotatably disposed on the inner circumferential side of the stator core 11 via a gap Gp. The rotor 30 includes the rotor core 31 fixed to the rotation shaft 32, a plurality of permanent magnets 33 fixed to the rotor core 31 and configuring magnetic poles, and non-magnetic end boards 34A and 34B attached to both end surfaces of the rotor core 31 in the axial direction. The rotor 30 is rotatably disposed by the rotation shaft 32 being pivotally supported by bearings 61A and 61B provided on end brackets 51A and 51B. The rotation shaft 31 may also be referred to as a drive shaft or a shaft.

The rotor core 31 mainly serves as a magnetic path and a strength member, and is formed by laminating thin plate-shaped steel sheets. The laminating direction of the steel sheets (laminated steel sheets) coincides with the axial direction. The end boards 34A and 34B are structural members disposed at both axial ends of the rotor core 32 in order to fix the steel sheets forming the rotor core 32 in the axial direction. Alternatively, the laminated steel sheets may be fixed by welding, and in this case, the end boards 34A and 34B may not be used. Electromagnetic steel sheets are usually used as the laminated steel sheets.

The housing 50 includes the pair of end brackets 51A and 51B having the bearings 61A and 61B, and a side surface portion 52, and houses the stator 10 and the rotor 30. The rotor 30 formed integrally with the rotation shaft 32 is rotatably held by the housing 50 via the bearings 61A and 61B.

In the present embodiment, the rotary electric machine 1 is assumed to be driven by a three-phase alternating current. For this reason, the rotation shaft 32 includes a resolver (rotation angle sensor) 35 that detects a position of a pole and a rotation speed of the rotor 30. Based on an output from the resolver 35, a control signal and a drive signal for a power module, not illustrated, performing a switching operation are generated in a control circuit and a drive circuit, not illustrated.

In the present embodiment, an embedded magnet motor is exemplified as the rotary electric machine 1, but the rotary electric machine 1 is not limited to the embedded magnet motor. As illustrated in FIG. 3, the rotor core 31 is provided with a plurality of magnet housings 36 along the circumferential direction, and the magnet 37 is inserted and fixed in a hole 36. The magnet housings 36 are configured by holes (magnet insertion holes).

In the present embodiment, the configuration where one pole includes three magnets 37 is exemplified, but the number of the magnets 37 configuring one pole is not limited to three. For example, one pole may be configured by one flat magnet, or by disposing two flat magnets in a V shape.

The rotor 30 in the present embodiment has eight magnetic poles (the number of poles=8). As described above, the stator 10 has forty-eight slots (the number of slots=48), and the three-phase coil 12 is wound (the number of phases=3). The rotary electric machine 1 of the present embodiment is a rotary electric machine of three phases, eight poles, and forty-eight slots. In this case, the number of slots per pole and per phase (NSPP) obtained by (the number of slots)/((the number of poles)×(the number of phases)) is two.

Next, the configuration of coil segments 121 and 122 constituting the coil 12 of the present embodiment will be described with reference to FIGS. 4A to 4C.

Figure 4A:
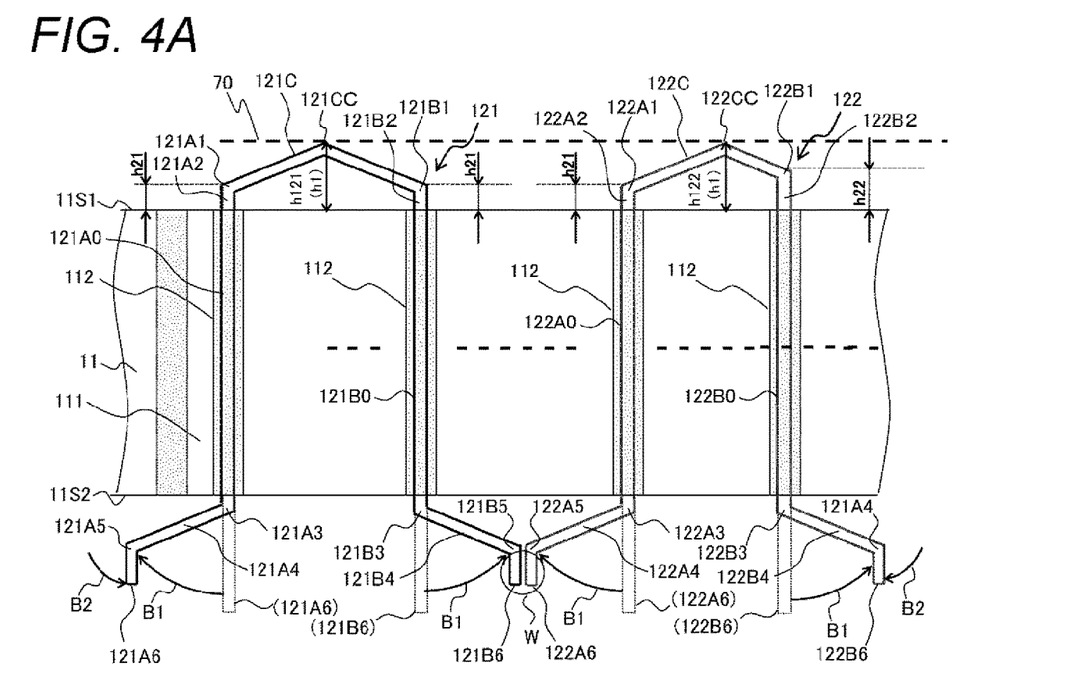
FIG. 4A is a view illustrating an assembled state of a first coil segment 121 and a second coil segment 122 constituting a coil 12 to the stator core 11 in an embodiment of the coil 12 of the present invention.

FIG. 4A is a view illustrating an assembled state of the first coil segment 121 and the second coil segment 122 constituting the coil 12 to the stator core 11 in one embodiment of the coil 12 of the present invention.

The coil 12 is wound around the stator core 11 including the plurality of segment conductors 121 and 122. The coil 12 is disposed as a wave winding across the plurality of slots and mechanically are put around the stator core 11 once. The segment conductor is a coil member having a rectangular cross section, and an insulating layer is provided on the outer circumference by enamel or the like.

The plurality of segment conductors 121 and 122 includes the first segment conductor 121 inserted into two slots 112 arranged with a first slot pitch and the second segment conductor 122 inserted into two slots arranged with a second slot pitch smaller than the first slot pitch. The plurality of the first segment conductors 121 is consecutively provided at the first slot pitch. The second segment conductor 122 is provided at the second slot pitch as the last segment conductor following the plurality of first segment conductors 121 in order to adjust the number of slots not to be insufficient.

In the present embodiment, as the rotary electric machine 1 with 8 poles and 48 slots, a configuration where the first slot pitch is set to 6 and the second slot pitch is set to 5 is exemplified.

Here, the first segment conductor 121 and the second segment conductor 122 will be described with reference to FIGS. 4B and 4C. FIG. 4B is a plan view schematically illustrating a shape characteristic of the first segment conductor 121 before assembling to the stator core 11. FIG. 4C is a plan view schematically illustrating a shape characteristic of the second segment conductor 122 before assembling to the stator core 11.

Figure 4B:
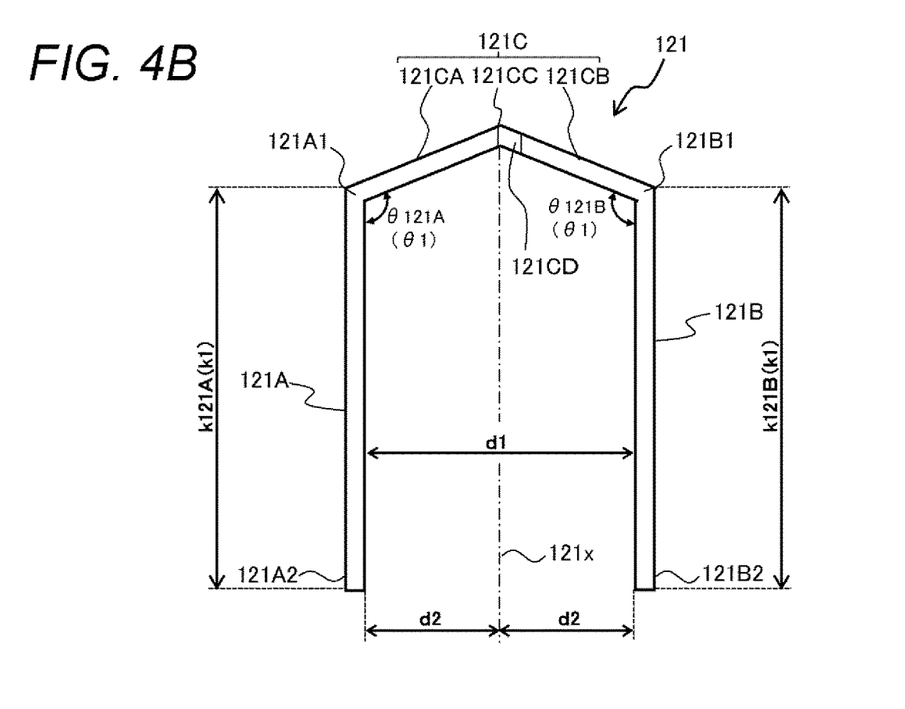
FIG. 4B is a plan view schematically illustrating a shape characteristic of the first segment conductor 121 before assembling to the stator core 11.

As illustrated in FIG. 4B, the first segment conductor 121 includes a pair of first leg portion 121A and second leg portion 121B, and an oblique side portion 121C formed in a substantially chevron shape with a center portion being an apex 121CC and connecting the first leg portion 121A and the second leg portion 121B. That is, the oblique side portion 121C has a first oblique side portion 121CA descending from the apex 121CC to the side of the first leg portion 121A and a second oblique side portion 121CB descending from the apex 121CC to the side of the second leg portion 121B with the apex 121CC being a boundary. The first oblique side portion 121CA is bent at an angle $\theta 121A$ (=$\theta 1$) at a bending portion 121A1 with respect to the first leg portion 121A. The second oblique side portion 121CB is bent at an angle $\theta 121B$ (=$\theta 1$) at a bending portion 121B1 with respect to the second leg portion 121B.

A length k121A of the first leg portion 121A and a length k121B of the second leg portion 121B are k1 and equal to each other. The angle $\theta 121A$ between the first oblique side portion 121CA and the first leg portion 121A and the angle $\theta 121B$ between the second oblique side portion 121CB and the second leg portion 121B are $\theta 1$ and equal to each other. The first segment conductor 121 has a space d1 that houses six teeth 111 (see FIG. 2) between the pair of first leg portion 121A and second leg portion 121B in order to be inserted into two slots arranged at the first slot pitch.

Reference numeral 121x denotes a center line of the first segment conductor 121 passing through the apex 121CC of the oblique side portion 121C. A distance between the first leg portion 121A and the center line 121x and a distance between a second leg portion 122A and the center line 121x are both d2 and equal to each other.

Figure 4C:
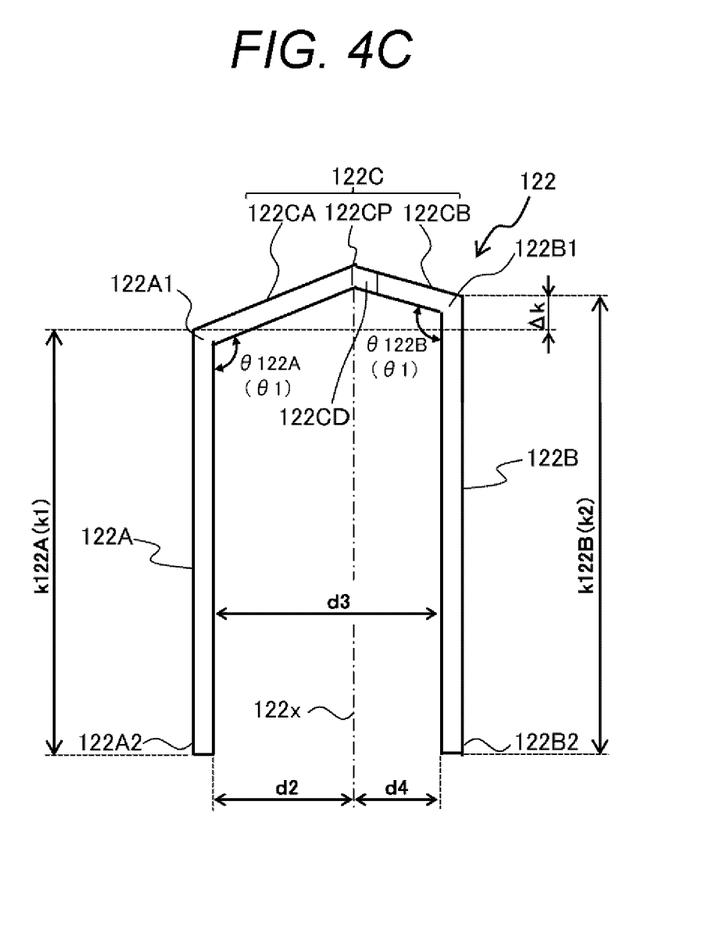
FIG. 4C is a plan view schematically illustrating a shape characteristic of the second segment conductor 122 before assembling to the stator core 11.

As illustrated in FIG. 4C, the second segment conductor 122 includes a pair of first leg portion 122A and second leg portion 122B, and an oblique side portion 122C connecting the first leg portion 122A and the second leg portion 122B. The oblique side portion 122C is formed in a substantially chevron shape having an apex 122CC, and has a first oblique side portion 122CA descending from the apex 121CC to the side of the first leg portion 122A and a second oblique side portion 122CB descending from the apex 122CC to the side of the second leg portion 122B with the apex 122CC being a boundary. The first oblique side portion 122CA is bent at an angle $\theta 122A$ (=$\theta 1$) at a bending portion 122A1 with respect to the first leg portion 122A. The second oblique side portion 122CB is bent at an angle $\theta 122B$ (=$\theta 1$) at a bending portion 122B1 with respect to the second leg portion 122B.

The second segment conductor 122 has a space d3 that houses five teeth 111 (see FIG. 2) between the pair of the first leg portion 122A and the second leg portion 122B in order to be inserted into two slots arranged at the second slot pitch. That is, d3 is smaller than d1 (d3<d1).

On the other hand, the angle $\theta 122A$ formed by the first oblique side portion 122CA with the first leg portion 122A and the angle $\theta 122B$ formed by the second oblique side portion 122C with the second leg portion 122B are both $\theta 1$ and equal to each other. The angle $\theta 122A$ and the angle $\theta 122B$ in the second segment conductor 122 are equal to the angle $\theta 121A$ and the angle $\theta 121B$ in the first segment conductor 121.

Therefore, the length k122B of the second leg portion 122B is k2, which is longer than a length k122A (=k1) of the first leg portion 122A by a difference $\Delta k$ between k2 and k1 (k2>k1). In this case, the length k122A of the first leg portion 122A of the second segment conductor 122 is k1, and equal to the length k121A of the first leg portion 121A and the length k121B of the second leg portion 121B of the first segment conductor 121.

Although 122x represents a line segment passing through the apex 122CC of the oblique side portion 122C, a distance d4 between the second leg portion 122A and the line segment 122x is shorter than a distance d2 between the first leg portion 122A and the line segment 122x. Note that the distance d2 between the first leg portion 122A and the line segment 122x is equal to the distance d2 between the first leg portion 121A and the center line 121x in the first segment conductor 121.

Figure 7:
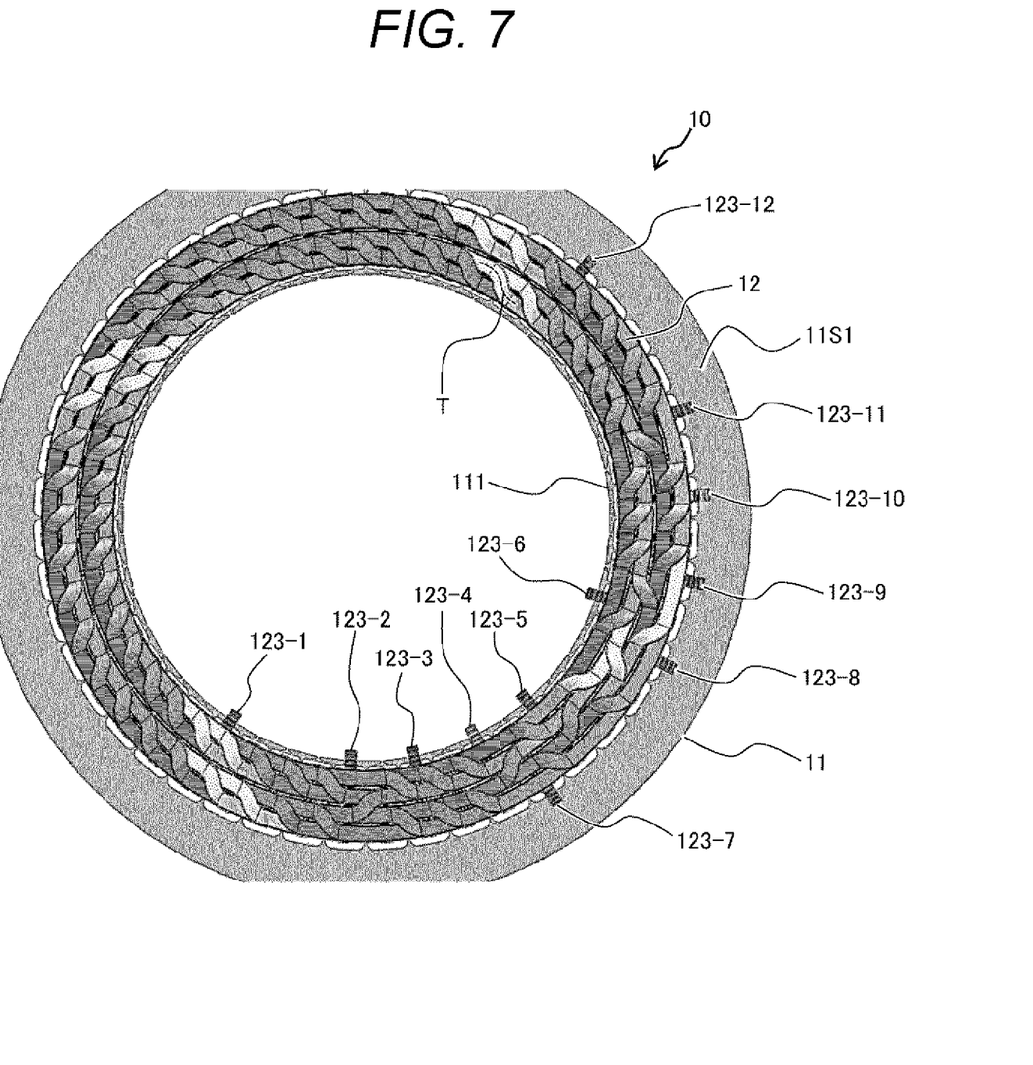
FIG. 7 is a plan view of the stator 10 of the rotary electric machine 1 as viewed from a first coil end portion side (end surface 11S1 side).

In addition, as illustrated in FIGS. 4B and 4C, a twisted portion 121CD is provided in the oblique side portion 121C of the first segment conductor 121, and a twisted portion 122CD in the oblique side portion 122C of the second segment conductor 122. The first segment conductor 121 and the second segment conductor 122 are disposed such that the plurality of segment conductors overlaps in a radial direction. At this time, the twisted portions (radial bending portions) 121CD and 122CD as indicated by a broken line T in FIG. 7 are formed in the segment conductors so as to avoid interference between the plurality of segment conductors.

Returning to FIG. 4A again, the description will be given. The first segment conductor 121 and the second segment conductor 122 in the states illustrated in FIGS. 4B and 4C are each inserted into the slots 112 of the fixing core 11. In the present embodiment, they are inserted into the slots 112 from an end face 11S1 of the fixing core 11.

In the first leg portion 121A of the first segment conductor 121 inserted into the slots 112, a portion 121A4 on a tip (lower end) 121A6 side of the first leg portion 121A is bent at a bending portion 121A3 toward a side opposite from the second leg portion 121B side with respect to a slot insertion portion 121A0 provided inside the slot 112. Further, in the second leg portion 121B of the first segment conductor 121, a portion 121B4 on a tip (lower end) 121B6 side of the second leg portion 121B is bent at a bending portion 121B3 toward a side opposite from the first leg portion 121A with respect to a slot insertion portion 121B0 provided inside the slot 112. The portion 121A4 bent at the bending portion 121A3 constitutes a third oblique side portion of the first segment conductor 121, and the portion 121B4 bent at the bending portion 121B3 constitutes a fourth oblique side portion of the first segment conductor 121.

Further, in the first leg portion 121A, the tip (lower end) 121A6 side of the first leg portion 121A is bent in a direction along the slot insertion portion 121A0 at a bending portion 121A5 with respect to the third oblique side portion 121A4. In the second leg portion 121B, the tip (lower end) 121B6 side of the second leg portion 121B is bent in a direction along the slot insertion portion 121B0 at a bending portion 121B5 with respect to the fourth oblique side portion 121B4.

In the first leg portion 122A of the second segment conductor 122 inserted into the slot 112, a portion 122A4 on a tip (lower end) 122A6 side of the first leg portion 122A is bent at a bending portion 122A3 toward a side opposite from the second leg portion 122B with respect to a slot insertion portion 122A0 provided inside the slot 112. Further, in the second leg portion 122B of the second segment conductor 122, a portion 122B4 on a tip (lower end) 122B6 side of the second leg portion 122B is bent at a bending portion 122B3 toward a side opposite from the first leg portion 122A with respect to a slot insertion portion 122B0 provided inside the slot 112. The portion 122A4 bent at the bending portion 122A3 constitutes a third oblique side portion of the second segment conductor 122, and the portion 122B4 bent at the bending portion 122B3 constitutes a fourth oblique side portion of the second segment conductor 122.

Further, in the first leg portion 122A, the tip (lower end) 122A6 side of the first leg portion 122A is bent in a direction along the slot insertion portion 122A0 at a bending portion 122A5 with respect to the third oblique side portion 122A4. In the second leg portion 122B, the tip (lower end) 122B6 side of the second leg portion 122B is bent in a direction along the slot insertion portion 122B0 at a bending portion 122B5 with respect to the fourth oblique side portion 122B4.

A portion between the bending portion 121A5 and the tip 121A6 in the first leg portion 121A of the first segment conductor 121 is welded to a portion on the tip 121B6 side in the second leg portion 121B of a different adjacent first segment conductor 121. On the other hand, a portion between the bending portion 121B5 and tip 121B6 in the second leg portion 121B is welded to a portion between the bending portion 122A5 and the tip 122A6 side in the first leg portion 122A of the adjacent second segment conductor 122.

The coil 12 includes the slot insertion portion 121A0 disposed inside the slot 112 and a first coil end portion protruding from the end face 11S1 of the stator core 11. The first coil end portion is mainly constituted by the oblique side portions 121C and 122C of the segment conductors 121 and 122, and includes linear portions 121A2, 121B2, 122A2, and 122B2 connected to the slot insertion portions 121A0, 121B0, 122A0, and 122B0.

The linear portion 121A2 is a portion constituting the first leg portion 121A of the first segment conductor 121 together with the slot insertion portion 121A0 (a first linear portion of the first segment conductor 121). The linear portion 121B2 is a portion constituting the second leg portion 121B of the first segment conductor 121 together with the slot insertion portion 121B0 (a first linear portion of the first segment conductor 121). The linear portion 122A2 is a portion constituting the first leg portion 122A of the second segment conductor 122 together with the slot insertion portion 122A0 (a first linear portion of the second segment conductor 122). The linear portion 122B2 is a portion constituting the second leg portion 122B of the second segment conductor 122 together with the slot insertion portion 122B0 (a second linear portion of the second segment conductor 122).

In the first coil end portion, one of the first segment conductor 121 and the second segment conductor 122 constitutes a coil end portion alone.

The coil 12 has a second coil end portion protruding from an end surface 11S2 of the stator core 11 on the side opposite from the side where the first coil end portion of the stator core 11 is formed. In the second coil end portion, the coil end portion is configured by connecting the first leg portion 121A and the second leg portion 121B of the two first segment conductors 121, or by connecting the second leg portion 121B of the first segment conductor 121 and the first leg portion 122A of the second segment conductor 122. The third oblique side portion 121A4 and the fourth oblique side portion 121B4 of the first segment conductor 121 and the third oblique side portion 122A4 and the fourth oblique side portion 122B4 of the second segment conductor 122 are configured in the second coil end portions. Further, the welded portion W of the two segment conductors is formed in the second coil end portion.

In the second segment conductor 122, the second linear portion 122B2 forming the linear portion on the one slot 112 side is longer than the first linear portion 122A2 forming the linear portion on the other slot 112 side. In the second linear portion 122B2 of the second segment conductor 122, a portion exposed to the outside of the stator core 11 from the end surface 11S1 of the stator core 11 in the second leg portion 122B (see FIG. 4C), that is, a height from the end surface 11S1 to the bending portion 122B1 is h22, and is larger than a height h21 from the end surface 11S1 to the bending portion 122A1 in the first linear portion 122A2 of the second segment conductor 122 (h22>h21). Note that the height h21 from the end surface 11S1 to the bending portion 122A1 in the first linear portion 122A2 of the second segment conductor 122 is equal to the height h21 from the end surface 11S1 to the bending portion 121A1 in the first linear portion 121A2 of the first segment conductor 121 and the height h21 from the end surface 11S1 to the bending portion 121B1 in the second linear portion 121B2 of the first segment conductor 121.

Further, a protruding height h121 from the end surface 11S1 of the stator core 11 in the first coil end portion of the first segment conductor 121 is equal to a protruding height h122 from the end surface 11S1 of the stator core 11 in the first coil end portion of the second segment conductor 122 (h121=h122=h1).

The stator 10 of the rotary electric machine 1 of the present embodiment has the following features.

The rotary electric machine 1 includes the stator 10 including the stator core 11 including the plurality of slots 112, and the coil 12 wound around the stator core 11, the coil including the plurality of segment conductors 121 and 122, the segment conductor 121 and 122 having slot insertion portions 121A0, 121B0, 122A0, and 122B0, the slot insertion portions 121A0, 121B0, 122A0, and 122B0 being disposed respectively inside the plurality of slots 112, the plurality of segment conductors 121 and 122 each having a coil end portion (first coil end portion) protruding from the end surface 11S1 of the stator core 11; and a rotor 30 disposed with a gap being spaced from the stator 10. The coil end portion includes linear portions 121A2, 121B2, 122A2, and 122B2 connected respectively to the slot insertion portions 121A0, 121B0, 122A0, and 122B0, and oblique side portions 121C and 122C having a chevron shape with center portions being apexes 121CC and 122CC. The plurality of segment conductors 121 and 122 includes a first segment conductor 121 inserted into two of the plurality of slots 112 arranged at a first slot pitch and a second segment conductor 122 inserted into two of the plurality of slots 112 arranged at a second slot pitch smaller than the first slot pitch. The second segment conductor 122 has a first linear portion 122A2 and a second linear portion 122B2, the second linear portion 122B2 serving as a linear portion on one of the two slots and being longer than the first linear portion 122A2 serving as a linear portion on the other one of the two slots. The center portion of the first segment conductor 121 has a protruding height h121 from the end surface 11S1 of the stator core 11, the protruding height h121 being equal to a protruding height h122 from the end surface 11S1 of the stator core 11 at the center portion of the second segment conductor 122.

According to the present embodiment, since the heights of the first coil end portions are aligned, positioning accuracy of the coil 12 by a jig 70 (see FIG. 4A), that is, the first segment 121 and the second segment conductor 122 is improved, and accurate bending can be performed on the first segment 121 and the second segment conductor 122. In addition, when the first segment 121 and the second segment conductor 122 are positioned and bent by the jig 70, the first segment 121 and the second segment conductor 122 are less likely to move in the axial direction, and damage of an insulating film of the first segment 121 and the second segment conductor 122 (movement of insulating paper) can be reduced. Further, since the processing accuracy at the time of bending the first segment 121 and the second segment conductor 122 is improved, it is possible to reduce the occurrence of defects at the time of welding the welded portion W.

In the present embodiment, since the bending angles (θ121A, θ121B, θ122A, and θ122B) of the first segment conductor 121 and the second segment conductor 122 are equal to each other, an increase in the number of inspections can be reduced. Further, variations in winding resistance and the like can be reduced, a yield rate can be improved, and reliability can be improved.

The rotary electric machine 1 of the present embodiment includes the stator 10 of the rotary electric machine 1 described above and the rotor 30 disposed, with a gap, being spaced from the stator 10, and the number of slots per pole per phase (NSPP) is 2. In this case, the coil 12 includes the first segment conductor 121 and the second segment conductor 122 serving as an odd-shape coil member with respect to the first segment conductor 121.

Figure 5:
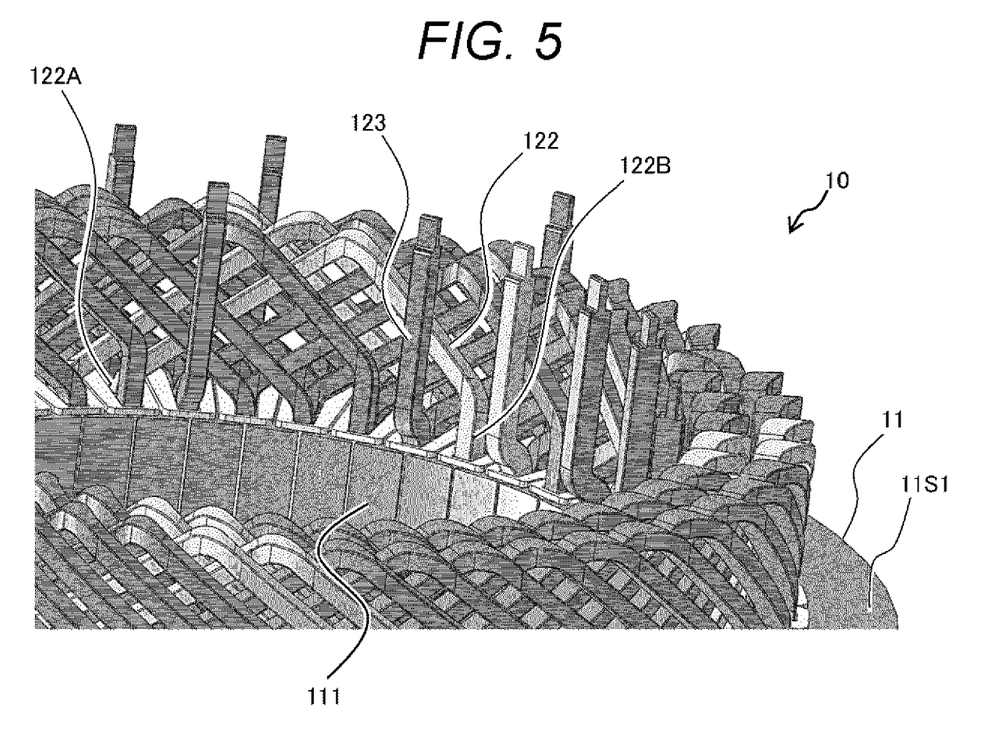
FIG. 5 is a perspective view illustrating an appearance of a coil end portion.
Figure 6:
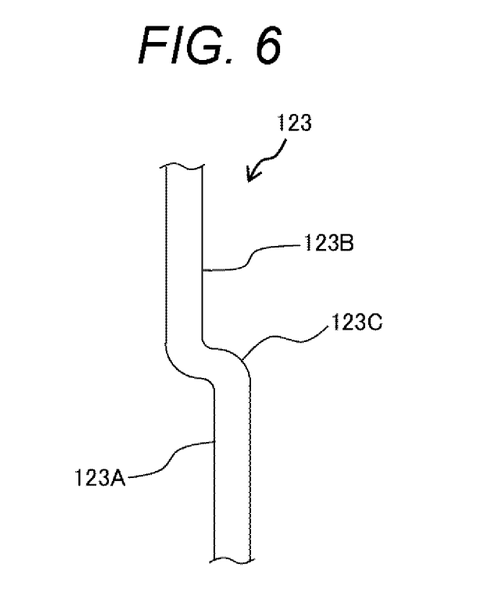
FIG. 6 is a plan view illustrating a shape of a lead segment conductor 123.

Next, a lead segment conductor 123 will be described with reference to FIGS. 5 and 6. FIG. 5 is a perspective view illustrating an appearance of the coil end portion. FIG. 6 is a plan view illustrating a shape of the lead segment conductor 123.

The coil 12 includes the lead segment conductor 123 constituting a lead wire. The lead segment conductor 123 includes a first lead portion 123A housed in the slot 112, a second lead portion 123B positioned at the first coil end portion, and a bent portion 123C provided between the first lead portion 123A and the second lead portion 123B. The first lead portion 123A has a linear shape parallel to the axial direction. The second lead portion 123B is connected to the first lead portion 123A via the bent portion 123C and has a linear shape parallel to the axial direction.

The positions of the first lead portion 123A and the second lead portion 123B in the radial direction with respect to the stator core 11 are different so that the second lead portion 123B is positioned on an inner circumferential side with respect to the first lead portion 123A. Further, the lead segment conductor 123 is disposed closer to the second linear portion 122B than the first linear portion 122A of the second segment conductor 122.

That is, the rotary electric machine 1 of the present embodiment has the following features.

The coil 12 includes the lead segment conductor 123 constituting the lead wire, and the lead segment conductor 123 includes the first lead portion 123A that is housed in the slot 112 and has a linear shape parallel to the axial direction, and the second lead portion 123B that is connected to the first lead portion 123A via the bent portion 123C and is positioned on the first coil end portion to have a linear shape. The positions of the first lead portion 123A and the second lead portion 123B are different in the radial direction with respect to the stator core 11 so that the second lead portion 123B is positioned on the inner circumferential side with respect to the first lead portion 123A. The lead segment conductor 123 is disposed closer to the second linear portion 122B than the first linear portion 122A of the second segment conductor 122.

As a result, the bent portion 123C of the lead segment conductor 123 can be disposed below the second oblique side portion 122CB of the second segment conductor 122 and between the end surface 11S1 of the stator core 11 and the second oblique side portion 122CB. A gap (a gap based on Δk in FIG. 4C) larger than the gap below the first oblique side portion 122CA is formed below the second oblique side portion 122CB of the second segment conductor 122, and interference between the second segment conductor 122 and the lead segment conductor 123 can be prevented.

FIG. 7 is a plan view of the stator 10 of the rotary electric machine 1 as viewed from a first coil end portion side (end surface 11S1 side).

In the rotary electric machine 1 of the present embodiment, the lead segment conductor 123 includes inner circumferential lead segment conductors 123-1 to 123-6 housed in the slots 112 at the position on the inner circumferential side of the stator core 11, and outer circumferential lead segment conductors 123-7 to 123-12 housed in the slots 112 at the position on the outer circumferential side of the stator core 11.

By adopting the above-described disposition for the second segment conductor 122 in at least one of the lead segment conductors 123-1 to 123-12, the interference between the second segment conductor 122 and the lead segment conductor 123 can be prevented at the portion of the lead segment conductor 123. By adopting the above-described disposition for the second segment conductor 122 in all the lead segment conductors 123-1 to 123-12, the height of the coil end portion (first coil end portion) can be reduced, and thus the rotary electric machine 1 can be downsized.

Figure 8:
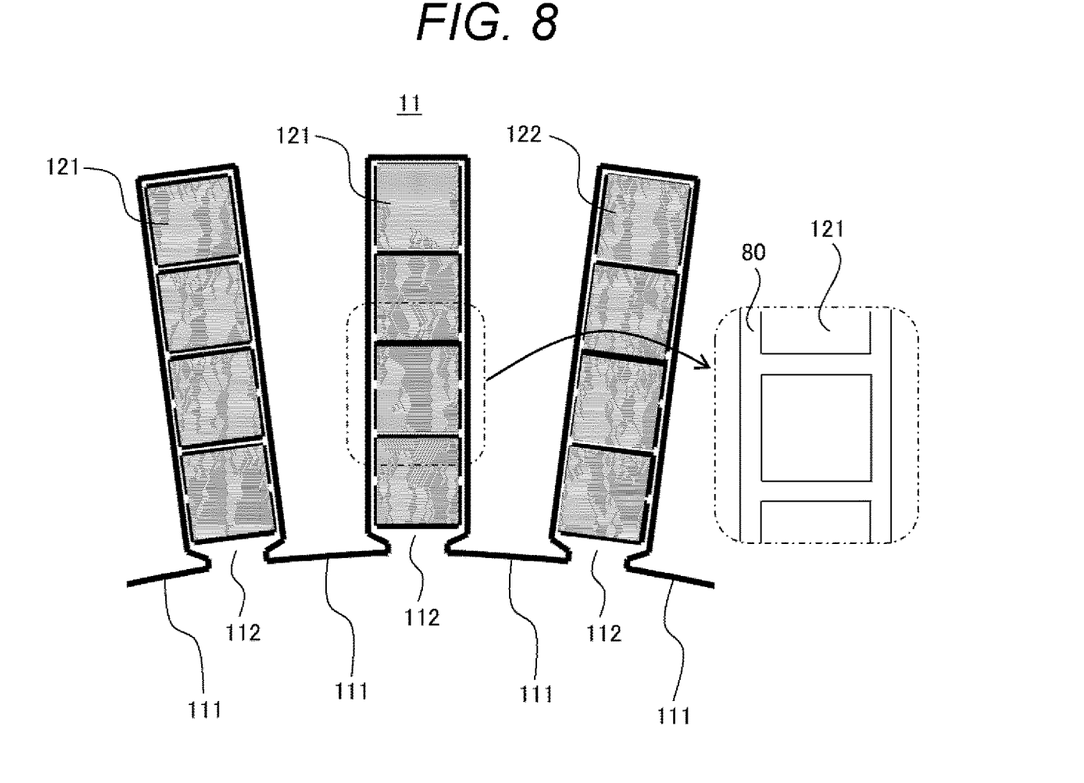
FIG. 8 is a partial cross-sectional view of slot portions 112 of a stator core 11 into which the first segment conductors 121 and the first segment conductor 122 are inserted.

FIG. 8 is a partial cross-sectional view of the stator core 11 into which the first segment conductor 121 and the second segment conductor 122 are inserted.

Inside the slots, an insulator 80 is disposed between the stator core 11 and the slot insertion portions 121A0 and 121B0 of the first segment conductor 121 and between the two slot insertion portions 121A0 adjacent to each other. The insulator 80 is made of, for example, varnish. Similarly to the first segment conductor 121, the insulator 80 is disposed between the stator core 11 and the slot insertion portions 122A0 and 122B0 of the second segment conductor 122 and between the two slot insertion portions 122A0 and 122B0 adjacent to each other.

That is, in the rotary electric machine 1 of the present embodiment, the insulator 80 is disposed inside each of the slots 112 between the stator core 11 and the slot insertion portions 121A0, 121B0, 122A0, and 122B0 of the segment conductors 121 and 122 and between the two slot insertion portions 121A0 and 121B0 and between the two slot insertion portions 122A0 and 122B0 adjacent to each other.

The insulator 80 is made of a non-conductive material such as varnish or insulating paper. Although the segment conductors 121 and 122 are insulated by enamels or the like, the insulation of the stator core 11 can be further improved by disposing the insulator 80, and the reliability of the rotary electric machine 1 can be improved.

Figure 9:
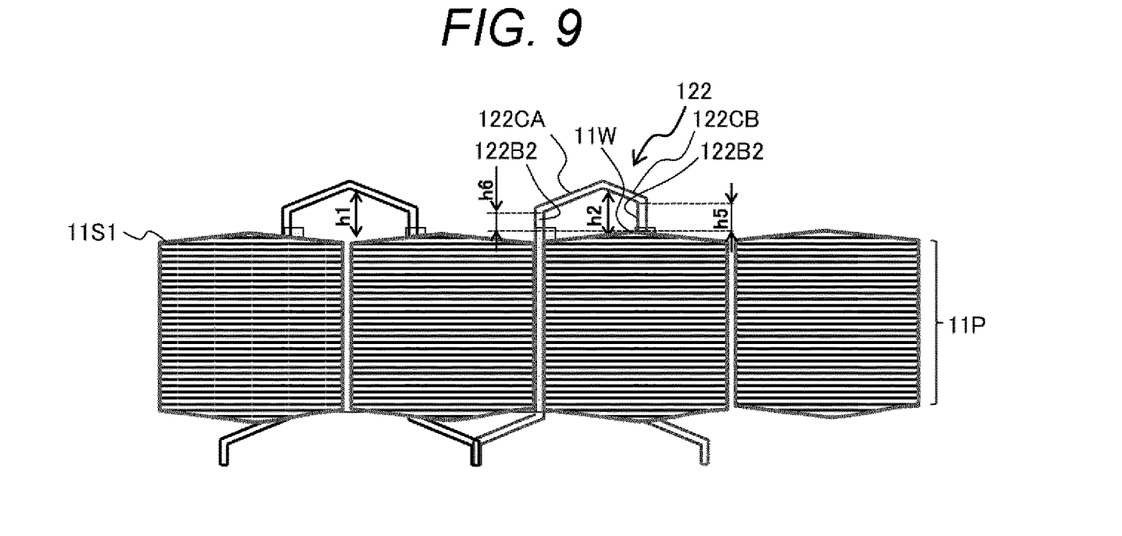
FIG. 9 is a diagram describing an embodiment where the stator core 11 is manufactured by laminating thin plate-shaped steel sheets, and the laminated steel sheets are joined by welding.

FIG. 9 is a diagram describing an embodiment where the stator core 11 is manufactured by laminating thin plate-shaped steel sheets, and the laminated steel sheets are joined by welding.

The stator core 11 of the present embodiment is configured by laminating steel sheets (for example, electromagnetic steel sheets) 11P. The laminated steel sheets have a welded part 11W welded and fixed. The welded part 11W of the stator core 11 is disposed closer to the second linear portion than to the first linear portion 121A of the second segment conductor 122.

That is, in the rotary electric machine 1 of the present embodiment, the stator core 11 has the welded part 11W where the steel sheets 11P are laminated and the laminated steel sheets 11P are welded and fixed, and the welded part 11W of the stator core 11 is disposed closer to the second linear portion 122B2 than the first linear portion 122A2 of the second segment conductor 122.

The welded part 11W may expand due to heat input during welding. In the present embodiment, since a gap h5 formed between the second oblique side portion 122CB and the end surface 11S1 of the stator core 11 on the second linear portion 122B2 side is larger than a gap h6 formed between the first oblique side portion 122CA and the end surface 11S1 of the stator core 11 on the first linear portion 122A2 side of the second segment conductor 122, interference with the expanding welded part 11W can be easily avoided. Alternatively, even when the welded part 11W expands, it is easy to dispose the lead segment conductors 123-1 to 123-12 and the like between the expanded end surface 11S1 and the second oblique side portion 122CB.

Figure 10:
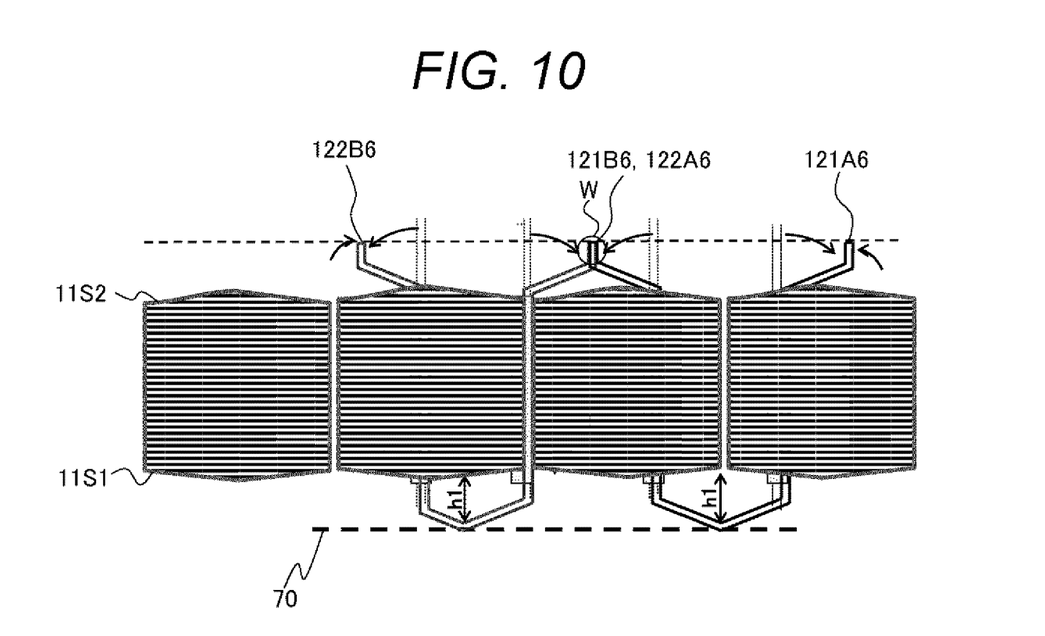
FIG. 10 is a view describing an embodiment where twisted portions 121CD and 122CD in FIGS. 4A and 4C are formed in a welded portion W.

FIG. 10 is a view describing an embodiment where the twisted portions 121CD and 122CD in FIGS. 4A and 4C are formed in the welded portion W.

The segment conductors 121 and 122 have second coil end portions 121A6, 121B6, 122A6, and 122B6 protruding from the end surface 11S2 opposite from the end surface 11S1 of the stator core 11 with respect to the stator core 11. The second coil end portions 121A6, 121B6, 122A6, and 122B6 of the segment conductors 121 and 122 are connected respectively to the second coil end portions 121A6, 121B6, 122A6, and 122B6 of different segment conductors 121 and 122 by welding on the side of the end surface 11S2 on the opposite side of the stator core 11.

The present embodiment has described that the first segment conductor 121 and the second segment conductor 122 can be positioned accurately by the jig 70, and the bending processing for the first segment conductor 121 and the second segment conductor 122 can be performed accurately. In the present embodiment, since the position of the welded portion W can be determined accurately, the twisted portions 121CD and 122CD provided in the oblique side portion 121C of the first segment conductor 121 and the oblique side portion 122C of the second segment conductor 122 can be provided in the welded portion W. That is, the twisted portions 121CD and 122CD that are bent in the radial direction can be provided at the joint portion W formed by welding the second coil end portions 121A6, 121B6, 122A6, and 122B6 of the segment conductors 121 and 122 to the second coil end portions 121A6, 121B6, 122A6, and 122B6 of different segment conductors 121 and 122.

That is, in the present embodiment, since the legs of the segment conductors 121 and 122 on the welded portion W side are aligned, the torsion of the coil 12 can be provided on the welded portion W side, and thus the weldability of the coil 12 can be improved.

Therefore, the rotary electric machine 1 of the present embodiment has the following features.

The segment conductors 121 and 122 have the second coil end portions 121A6, 121B6, 122A6, and 122B6 protruding from the end surface 11S2 opposite from the end surface 11S1 of the stator core 11 with respect to the stator core 11. The second coil end portions 121A6, 121B6, 122A6, and 122B6 of the segment conductors 121 and 122 are connected to the second coil end portions 121A6, 121B6, 122A6, and 122B6 of different segment conductors 121 and 122 by welding on the side of the end surface 11S2 on the opposite side of the stator core 11. The twisted portions 121CD and 122CD that are bent in the radial direction are provided at the joint portion formed by welding the second coil end portions 121A6, 121B6, 122A6, and 122B6 of the segment conductors 121 and 122 to the second coil end portions 121A6, 121B6, 122A6, and 122B6 of the different segment conductors 121 and 122.

In the present embodiment, since the degree of freedom in the disposition of the twisted portions 121CD and 122CD is increased, the degree of freedom in designing the rotary electric machine 1 is improved.

Second Embodiment

The rotary electric machine 1 according to the present embodiment is applicable to a pure electric vehicle that travels with power of only the rotary electric machine or a hybrid electric vehicle that is driven by both an engine and the rotary electric machine, but a hybrid electric vehicle will be described as an example.

Figure 11:
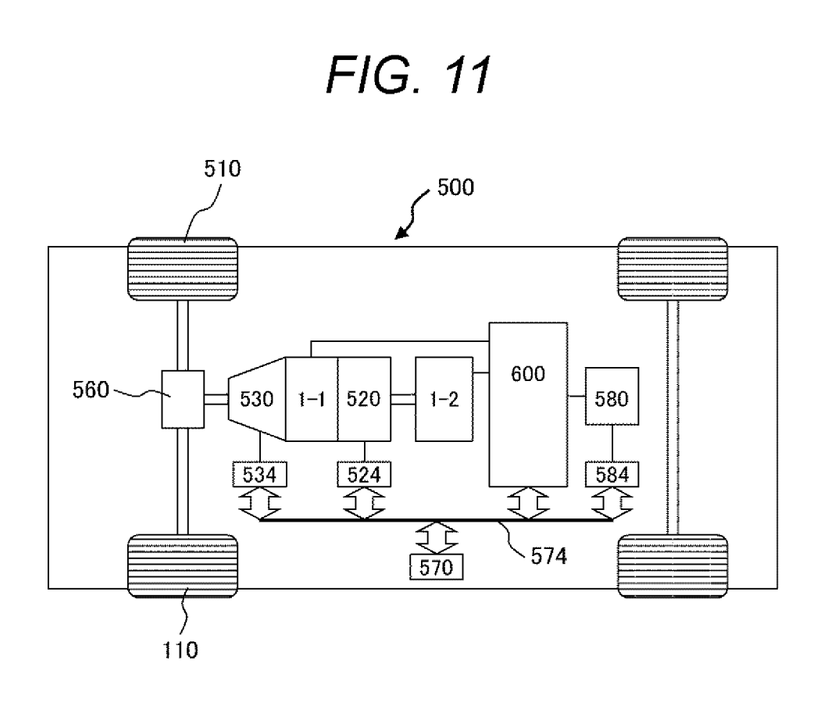
FIG. 11 is a diagram illustrating a schematic configuration of a hybrid electric vehicle 500 on which the rotary electric machine 1 according to an embodiment of the present invention is mounted.

An engine 520, a first rotary electric machine 1-1, a second rotary electric machine 1-2, and a battery 580 are mounted on a vehicle 500. The battery 580 supplies DC power to the first rotary electric machine 1-1 and the second rotary electric machine 1-2 via a power conversion device 600 in a case where driving force by the first rotary electric machine 1-1 and the second rotary electric machine 1-2 is required for the vehicle 500. Further, the battery 580 receives DC power from the first rotary electric machine 1-1 and the second rotary electric machine 1-2 during regenerative traveling. Transmission and reception of DC power between the battery 580 and the first rotary electric machine 1-1 or the second rotary electric machine 1-2 is performed via the power conversion device 600. Although not illustrated, a battery that supplies low voltage power (for example, 14 volt system power) is mounted on the vehicle 500, and supplies DC power to a control circuit, described below.

Note that the first rotary electric machine 1-1 and the second rotary electric machine 1-2 have substantially the same structure, and can be configured by the rotary electric machine 1, described above. However, both the first rotary electric machine 1-1 and the second rotary electric machine 1-2 do not need to have the structure related to the first segment conductor 121 and the second segment conductor 122, and only one of them may have this structure.

A rotation torque generated by the engine 520, the first rotary electric machine 1-1 or the second rotary electric machine 1-2 is transmitted to a front wheel 510 via a transmission 530 and a differential gear 560. The transmission 530 is controlled by a transmission control device 534. The engine 520 is controlled by an engine control device 524. The battery 580 is controlled by a battery control device 584. The transmission control device 534, the engine control device 524, the battery control device 584, the power conversion device 600, and an integrated control device 570 are connected to each other via a communication line 574.

The integrated control device 570 is a control device higher than the transmission control device 534, the engine control device 524, the power conversion device 600, and the battery control device 584, and receives information representing respective states of the transmission control device 534, the engine control device 524, the power conversion device 600, and the battery control device 584 from these devices via the communication line 574. The integrated control device 570 calculates control commands for the respective devices based on the acquired information. The calculated control commands are transmitted to the devices via the communication line 574.

The battery 580 is configured by a secondary battery such as a lithium ion battery or a nickel hydrogen battery, and outputs high voltage DC power of 250 V to 600 V or higher. The battery control device 584 outputs the charge and discharge status of the battery 580 and the state of each unit cell battery configuring the battery 580 to the integrated control device 570 via the communication line 574.

When determining that the battery 580 needs to be charged, based on the information from the battery control device 584, the integrated control device 570 instructs the power conversion device 600 to perform a power generation operation. In addition, the integrated control device 570 mainly performs management of output torques from the engine 520, the first rotary electric machine 1-1, and the second rotary electric machine 1-2, calculation processing for a total torque and a torque distribution ratio of the output torque from the engine 520 and the output torques from the first rotary electric machine 1-1 and the second rotary electric machine 1-2, and transmits control commands based on a result of the calculation processing to the transmission control device 534, the engine control device 524, and the power conversion device 600. The power conversion device 600 controls the first rotary electric machine 1-1 and the second rotary electric machine 1-2 so as to generate torque outputs or generated power according to the commands, based on a torque command from the integrated control device 570.

The power conversion device 600 is provided with a power semiconductor constituting an inverter circuit for operating the first rotary electric machine 1-1 and the second rotary electric machine 1-2. The power conversion device 600 controls a switching operation of the power semiconductor based on a command from the integrated control device 570. By the switching operation of the power semiconductor, the first rotary electric machine 1-1 and the second rotary electric machine 1-2 are operated as an electric motor or a generator.

In a case where the first rotary electric machine 1-1 and the second rotary electric machine 1-2 are operated as electric motors, DC power from the high-voltage battery 580 is supplied to a DC terminal of an inverter of the power conversion device 600. The power conversion device 600 controls the switching operation of the power semiconductor to convert the supplied DC power into three-phase AC power, and supplies the converted power to the first rotary electric machine 1-1 and the second rotary electric machine 1-2. On the other hand, in a case where the first rotary electric machine 1-1 and the second rotary electric machine 1-2 are operated as generators, the rotors of the first rotary electric machine 1-1 and the second rotary electric machine 1-1 are rotationally driven by a rotational torque externally applied, and three-phase AC power is generated in the stator windings of the first rotary electric machine 1-1 and the second rotary electric machine 1-2. The generated three-phase AC power is converted into DC power by the power conversion device 600, and this DC power is supplied to the battery 580, and thus the high-voltage battery 580 is charged.

In the present embodiment, as the electric drive system including the rotary electric machines 1-1 and 1-2 that generate the driving force of the vehicle and the power conversion device 600, it is preferable to provide the rotary electric machine 1 having the stator 30 where the coil 12 includes the first segment conductor 121 and the second segment conductor 122, and the rotor 30 rotatably disposed on the inner circumferential side of the stator core 11 via the gap.

That is, the electric drive system of the present embodiment that includes a rotary electric machine 1 that generates drive force of a vehicle and a power conversion device includes, as the rotary electric machine, the rotary electric machine of the present embodiment.

The rotary electric machine 1 of the present embodiment can be reduced in size and cost, and is suitable for application to a motor for a main machine for an automobile.

Note that the present invention is not limited to the above embodiments, and various modifications are possible. For example, the above-described embodiments have been described in detail for easy understanding of the present invention, and the present invention is not necessarily limited to an aspect including all the described configurations. In addition, a part of the configuration in each embodiment can be deleted or another configuration can be added.

REFERENCE SIGNS LIST

1 rotary electric machine
10 stator
11 stator core
11P steel sheet
11S1 end surface of stator core 11
11W welded part
12 coil
80 insulator
112 slot
121 segment conductor (first segment conductor)
122 segment conductor (second segment conductor)
121A0, 121B0, 122A0, 122B0 slot insertion portion of segment conductor
121A2, 121B2, 122A2, 122B2 linear portion of coil end portion
121A6, 121B6, 122A6, 122B6 second coil end portion
121C, 122C oblique side portion
121CC, 122CC apex of coil end portion
121CD, 122CD twisted portion
122A2 first linear portion
122B2 second linear portion
123 lead segment conductor
123-1 to 123-6 inner circumferential lead segment conductor
123-7 to 123-12 outer circumferential lead segment conductor
123A first lead portion
123B second lead portion
123C bent portion

The invention claimed is:

1. A rotary electric machine, comprising:
a stator including
a stator core including a plurality of slots, and
a coil wound around the stator core, the coil including a plurality of segment conductors each having slot insertion portions disposed respectively inside the plurality of slots and a first coil end portion protruding from a first end surface in an axial direction with respect to the stator core; and
a rotor disposed, with a gap, being spaced from the stator,
wherein the first coil end portion includes linear portions connected respectively to the slot insertion portions and oblique side portions having a chevron shape with center portions being apexes,
wherein the plurality of segment conductors includes a first segment conductor inserted into two of the plurality of slots arranged at a first slot pitch and a second segment conductor inserted into two of the plurality of slots arranged at a second slot pitch smaller than the first slot pitch,
wherein the second segment conductor has a second linear portion that serves as the linear portion on one of the two slots and is longer than a first linear portion serving as the linear portion on the other one of the two slots, and
wherein the center portion of the first segment conductor has a protruding height from the first end surface of the stator core, the height being substantially equal to a protruding height from the first end surface of the stator core at the center portion of the second segment conductor.

2. The rotary electric machine according to claim 1, wherein the plurality of slots includes two slots per pole per phase.

3. The rotary electric machine according to claim 1,
wherein the coil includes a lead segment conductor constituting a lead wire,
wherein the lead segment conductor includes a first lead portion that is housed in the plurality of slots and has a linear shape parallel to an axial direction, and a second lead portion that is connected to the first lead portion via a bent portion and is positioned on the first coil end portion to have a linear shape,
wherein the first lead portion and the second lead portion are disposed on different positions in a radial direction with respect to the stator core, with the second lead portion being on an inner circumferential side with respect to the first lead portion, and
wherein the lead segment conductor is disposed closer to the second linear portion than to the first linear portion of the second segment conductor.

4. The rotary electric machine according to claim 3, wherein the lead segment conductor includes inner circumferential lead segment conductors housed in the plurality of slots at a position on the inner circumferential side of the stator core, and outer circumferential lead segment conductors housed in the plurality of slots at a position on an outer circumferential side of the stator core.

5. The rotary electric machine according to claim 1, wherein the plurality of slots each includes therein an insulator disposed between the stator core and the slot insertion portions of the plurality of segment conductors and between the two slot insertion portions adjacent to each other.

6. The rotary electric machine according to claim 1,
wherein the stator core has a welded part where steel sheets are laminated and the laminated steel sheets are welded and fixed, and
wherein the welded part of the stator core is disposed closer to the second linear portion than to the first linear portion of the second segment conductor.

7. The rotary electric machine according to claim 1,
wherein the plurality of segment conductors each has second coil end portions protruding from a second end surface opposite from the first end surface of the stator core with respect to the stator core,
wherein the second coil end portions of each of the plurality of segment conductors are connected to second coil end portions of a different segment conductor among the plurality of segment conductors by welding on a side of the end surface on an opposite side of the stator core, and
wherein the second coil end portions of each of the plurality of segment conductors each include a joint portion obtained by welding to the second coil end portions of a different segment conductor among the plurality of segment conductors, the joint portion having a twisted portion bent in the radial direction.

8. An electric drive system comprising the rotary electrical machine of claim 1.

* * * * *